(12) United States Patent
Ahmed et al.

(10) Patent No.: US 11,511,361 B2
(45) Date of Patent: Nov. 29, 2022

(54) ELECTRO-DISCHARGE MACHINING TOOL AND A METHOD OF USING THE SAME

(71) Applicant: ROLLS-ROYCE plc, London (GB)

(72) Inventors: Shamraze Ahmed, Nottingham (GB); Jonathon Mitchell-Smith, Nottingham (GB); Alexander Jackson-Crisp, Nottingham (GB); Adam Clare, Nottingham (GB)

(73) Assignee: ROLLS-ROYCE plc, London (GB)

(*) Notice: Subject to any disclaimer, the term of this patent is extended or adjusted under 35 U.S.C. 154(b) by 578 days.

(21) Appl. No.: 16/599,963

(22) Filed: Oct. 11, 2019

(65) Prior Publication Data

US 2020/0122253 A1    Apr. 23, 2020

(30) Foreign Application Priority Data

Oct. 22, 2018  (GB) ..................................... 1817156

(51) Int. Cl.
  *B23H 1/04*  (2006.01)
  *B23H 9/00*  (2006.01)

(52) U.S. Cl.
  CPC ............. *B23H 1/04* (2013.01); *B23H 9/001* (2013.01)

(58) Field of Classification Search
  CPC . B23H 1/04; B23H 9/001; B23H 7/26; B23H 7/28; B23H 7/30
  See application file for complete search history.

(56) References Cited

U.S. PATENT DOCUMENTS

| 4,654,499 A | * | 3/1987 | Houman | ................... | B23H 1/04 |
| | | | | | 219/69.15 |
| 5,618,449 A | * | 4/1997 | Houman | ................ | B23H 9/001 |
| | | | | | 219/69.11 |
| 8,178,814 B2 | | 5/2012 | Gold et al. | | |
| 8,278,584 B2 | | 10/2012 | Gold et al. | | |
| 8,963,040 B2 | | 2/2015 | Legge et al. | | |
| 9,630,268 B2 | | 4/2017 | Rudgley et al. | | |

(Continued)

FOREIGN PATENT DOCUMENTS

| GB | 2462817 A * | 2/2010 | ............... B23H 7/26 |
| WO | WO-9733086 A1 * | 9/1997 | ............... B23H 9/00 |

(Continued)

OTHER PUBLICATIONS

Mar. 13, 2020 Search Report issued in European Patent Application No. 19 20 2483.

(Continued)

*Primary Examiner* — Geoffrey S Evans
(74) *Attorney, Agent, or Firm* — Oliff PLC

(57) ABSTRACT

An electro-discharge machining (EDM) device that includes a housing, an erosion electrode, a ground electrode, and a dielectric inlet. The housing is configured to be positioned on a surface of a workpiece and proximal to a fastener to be eroded. The planar erosion electrode is positioned at least partially within the housing, with the erosion electrode being movable relative to the housing in a first axis. The first axis is substantially normal to a longitudinal axis of the fastener. The ground electrode is conductively connected to the fastener. The dielectric inlet is configured to deliver a dielectric fluid to a region between the erosion electrode and the fastener.

20 Claims, 4 Drawing Sheets

(56) References Cited

U.S. PATENT DOCUMENTS

| | | | |
|---|---|---|---|
| 2005/0129499 A1* | 6/2005 | Morris | F01D 9/04 |
| | | | 415/1 |
| 2005/0184030 A1 | 8/2005 | Bermann et al. | |
| 2010/0096365 A1 | 4/2010 | Gold et al. | |
| 2011/0114605 A1* | 5/2011 | Gold | B23H 1/10 |
| | | | 219/69.11 |
| 2011/0266258 A1 | 11/2011 | Legge et al. | |
| 2012/0217225 A1* | 8/2012 | Rudgley | B23H 1/02 |
| | | | 219/69.16 |
| 2016/0361770 A1 | 12/2016 | Rudgley | |
| 2018/0257183 A1 | 9/2018 | Fisher et al. | |

FOREIGN PATENT DOCUMENTS

| | | |
|---|---|---|
| WO | 2011/106080 A2 | 9/2011 |
| WO | 2012/097130 A2 | 7/2012 |
| WO | 2012/097183 A2 | 7/2012 |
| WO | 2012/102993 A2 | 8/2012 |
| WO | 2012/103017 A2 | 8/2012 |
| WO | WO-2012103017 A2 * | 8/2012 ............... B23H 1/00 |

OTHER PUBLICATIONS

Jan. 31, 2019 Combined Search and Examination Report issued in British Patent Application No. GB1817156.1.

* cited by examiner

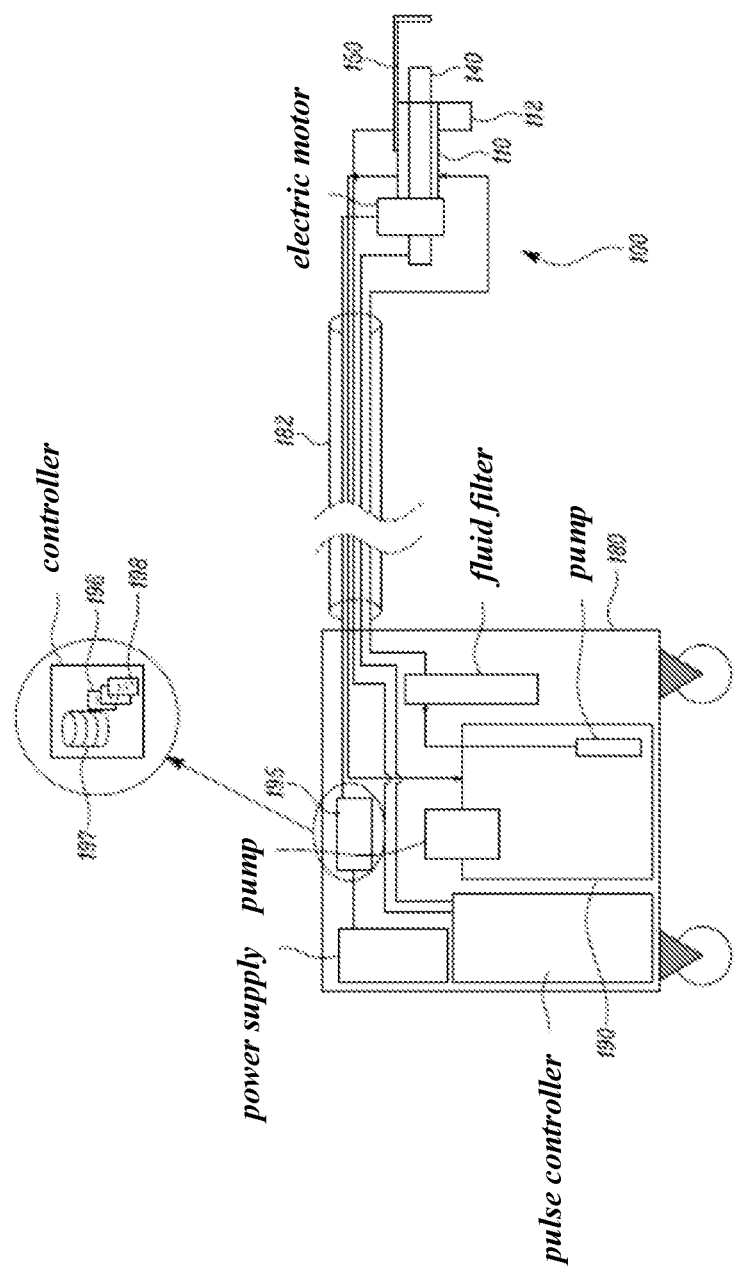

ELECTRO-DISCHARGE MACHINING TOOL AND A METHOD OF USING THE SAME

This disclosure claims the benefit of UK Patent Application No. GB 1817156.1, filed on 22 Oct. 2018, which is hereby incorporated herein in its entirety.

FIELD OF THE DISCLOSURE

The present disclosure relates to a hand-held electro-discharge machining tool and particularly, but not exclusively, to a hand-held electro-discharge machining tool for removing fasteners.

BACKGROUND TO THE DISCLOSURE

Electric Discharge Machining (EDM) is a well-known technique that is used for the machining of metal materials. EDM as the title suggests creates an electrical discharge by the removal of material from a workpiece. The electrical discharge phenomenon results from an electrical voltage being applied between an electrode and the workpiece. Typically, the electrical voltage is applied in the form of a high frequency pulsed waveform. In conventional EDM machining operations, the electrode and the workpiece are both immersed in a dielectric fluid bath.

Control of the voltage, pulse frequency, and electrode-to-workpiece gap enable the electrical discharge, and hence the material removal, to be controlled. The mark space ratio of the spark duration versus the quench duration is controlled to ensure that the temperatures of the workpiece and the electrode bulk material do not reach their corresponding melting temperatures.

Complex mechanical assemblies such as, for example, turbofan gas turbine engines, are often required to be disassembled for service, maintenance or repair purposes. The separation of such large assemblies into smaller sub-assemblies or component parts is typically labour intensive with the requirement to separate bolted joints that have been subjected to extremes of thermal and/or mechanical conditions. Such bolted joints are frequently mechanically seized and require machining operations in order to separate them.

Conventional machining techniques often cannot be used to separate such joints assemblies due to the work hardening nature of the materials. Furthermore, there are often access limitations resulting from the design of the assembly that result in fasteners that have very limited access. Such limited access prohibits the use of conventional machining techniques because the machine tool cannot reach the fastener.

An example of a prior art portable EDM device is disclosed in U.S. Pat. No. 8,178,814. This portable device requires an operator to hold a tool against a workpiece whilst an electrode is advanced towards the surface of the workpiece. Such tools are restricted to use in regions that are easily accessible by hand because the operator must apply a force against the workpiece surface to operate the device. Direct line of sight to the region to be eroded is required for positioning. The reach of such devices is limited to the length of arm of the operator and the operator's ability to see the target surface.

STATEMENTS OF DISCLOSURE

According to a first aspect of the present disclosure there is provided an electro-discharge machining (EDM) device comprising:

a housing configured to be positioned on a surface of a workpiece and proximal to a fastener to be eroded;

an erosion electrode positioned at least partially within the housing, the erosion electrode being movable relative to the housing in a first axis, the first axis being substantially normal to a longitudinal axis of the fastener;

a ground electrode being conductively connected to the fastener; and a dielectric inlet being configured to deliver a dielectric fluid to a region between the erosion electrode and the fastener.

The EDM device of the disclosure can be used in a location in which the fastener to be eroded is not easily accessible by hand. The prior art EDM devices require that the human operator applies hand pressure to the EDM device in order to maintain the position of the erosion electrode relative to the component to be eroded, and also to ensure that the distal end of the device seals against the workpiece to prevent leakage of dielectric fluid. Indeed, provided the housing of the EDM device can be positioned proximal to the fastener to be eroded then the EDM device can be remotely operated to erode the fastener. This positioning operation may be carried out by a manipulator, whether robotic, autonomous or mechanically controlled by an operator.

In contrast, prior art portable EDM devices are restricted to use in regions in which an operator can both reach the fastener to be eroded and in which the operator has a direct line of sight to the fastener so that the EDM device can be correctly positioned. Incorrect positioning of such a portable EDM device can results in erosion of the incorrect part of the workpiece, which may result in the workpiece requiring costly and lengthy repair or even in the workpiece being scrapped.

Optionally, the erosion electrode is planar.

The use of a planar geometry for the erosion electrode enables the electrode portion to be easily and cheaply manufactured. A planar erosion electrode may more easily be moved in and out of the housing along the first axis because such movement may be linear.

In one arrangement, the erosion electrode has a flat planar geometry that extends linearly in a flat plane. In this arrangement the erosion electrode has a flat cross-sectional geometry.

In another arrangement, the erosion electrode may have a curved planar geometry in which a cross-sectional geometry of the erosion electrode is, for example, a semi-circle or part thereof.

In a further arrangement, the erosion electrode may have a tubular planar geometry in which a cross-sectional geometry of the erosion electrode is, for example, circular or elliptical.

Optionally, the housing comprises one or more alignment portions, and the or each alignment portion of the housing is configured to locate against the fastener, to secure the housing proximal to the fastener.

Optionally, the fastener extends from the workpiece, the workpiece comprises one or more alignment features, the housing comprises one or more alignment portions, and the or each alignment portion of the housing is configured to locate against a corresponding alignment feature of the workpiece, to secure the housing proximal to the fastener.

The housing may comprise one or more alignment portions that locate against the fastener to securely position the housing relative to the fastener.

The or each alignment portion may also incorporate the ground electrode so as to conductively connect to the fastener.

The interconnection between the one or more alignment portions and the corresponding alignment features means that the housing of the EDM device can be securely held against the surface of the workpiece without the need for an operator to hold the housing in place. This enables the EDM device to be operated in regions which are inaccessible to a human operator. This in turn makes the EDM device more useful and hence convenient for a user.

Optionally, the EDM device further comprises a dielectric outlet, wherein the dielectric outlet is configured to evacuate the dielectric fluid from the working region.

The dielectric outlet provides a suction pressure to evacuate the dielectric fluid from the region between the erosion electrode and the fastener. This prevents the dielectric fluid from spilling over the workpiece and makes the EDM device more convenient for a user.

The dielectric outlet evacuates the dielectric fluid that has occupied the space between the erosion electrode and the fastener and has accumulated eroded particles from the fastener. This particle laden dielectric fluid can then be filtered to remove the debris particles and recycled back to the dielectric inlet.

Optionally, the housing is configured to enclose a working volume when positioned against the workpiece, the fastener extends from the workpiece into the working volume, the erosion electrode moves within the working volume, and the dielectric fluid is delivered into the working volume.

By enclosing a working volume, the housing provides a limited space into which the dielectric fluid is delivered. This means that a smaller volumetric flow rate of the dielectric fluid will be required to flood the region between the erosion electrode and the fastener.

Optionally, an outlet flow through the dielectric outlet produces a working pressure within the working volume, the working pressure being less than an ambient pressure surrounding the housing.

Maintaining a working pressure within the working volume at a lower pressure than the ambient pressure surrounding the housing causes the housing to be pressed against the surface of the workpiece. This aids location of the housing against the workpiece and relative to the fastener. This also provides for a more complete seal between the housing and the surface of the workpiece so minimising leakage of the dielectric fluid from the working volume.

The lower working pressure within the housing assists in containing the dielectric fluid within the housing during operation of the EDM device.

Optionally, a difference between the ambient pressure and the working pressure is a working pressure drop, and the working pressure drop is preferably greater than 14 kPa, and more preferably greater than 28 kPa.

A working pressure drop of approximately 5 psi (approximately 35 kPa) provides a balance between the increased energy required to produce the pressure drop and the improved sealing behaviour of the joint between the housing and the surface of the workpiece. However, a working pressure drop of less than 5 psi may still provide an improvement in sealing behaviour.

Optionally, the EDM device further comprises an electric motor, wherein the electric motor is configured to bi-directionally move the erosion electrode relative to the fastener along the first axis.

The use of an electric motor to bi-directionally drive the erosion electrode to and from the fastener enables the motion of the erosion electrode to be precisely controlled. This control may be implemented by a computer or other microprocessor unit.

Optionally, the erosion electrode has a lateral width that is greater than a lateral width of the fastener to be eroded.

The erosion electrode has a lateral width that is greater than a lateral width of a bolt portion of the fastener to be eroded, which means that the erosion electrode can erode the entire cross-section of the bolt portion of the fastener in a single pass. This makes the EDM device quicker and more cost effective than prior art devices.

Optionally, the erosion electrode is flat.

The use of a flat geometry for the erosion electrode makes the electrode simple and cost effective to replace. Since the erosion electrode is consumable it is necessary to make provision for frequent replacement of this part and hence to minimise user intervention.

In an alternative arrangement the erosion electrode is hollow with the dielectric inlet being provided through the hollow erosion electrode. This arrangement simplifies the structure of the EDM device by eliminating the separate dielectric inlet.

Optionally, the EDM device further comprises a cartridge portion, wherein the erosion electrode is accommodated within the cartridge portion, and the cartridge portion is removably positioned within the housing.

As outlined above the erosion electrode is a consumable component part and may be required to be replaced for each fastener that is to be eroded. By making the erosion electrode part of a cartridge portion it is possible to quickly and easily replace the erosion electrode by replacing the cartridge portion. This makes the EDM device more convenient for a user.

The cartridge portion is arranged to correspond to the geometry of the particular fastener and workpiece arrangement to which the EDM device is being applied. In other words, the cartridge portion is bespoke to the particular fastener and workpiece arrangement.

In an alternative arrangement, the housing and the cartridge portion are integrally formed. This makes the EDM device more convenient and easier for a user to operate.

Optionally, the fastener extends above a surface of the workpiece, and the plane of the erosion electrode is offset from the surface of the workpiece by a clearance.

In arrangements where the fastener extends above the surface of the workpiece it is often necessary to prevent any damage to the surface of the workpiece or the components to be disassembled. Consequently, by offsetting the plane of the erosion electrode from the surface of the workpiece the EDM operation cannot impinge on the surface of the workpiece and so prevents damage to the underlying surface.

According to a second aspect of the present disclosure there is provided a method of electro-discharge machining a fastener, the fastener being located in a workpiece, the method comprising the steps of:

providing an EDM device comprising a housing, an erosion electrode, and a ground electrode;

positioning the housing on a surface of the workpiece and proximal to the fastener;

positioning the ground electrode in conductive connection with the fastener;

delivering a dielectric fluid to a region between the erosion electrode and the fastener;

moving the erosion electrode in a first axis towards the fastener, the first axis being substantially normal to a longitudinal axis of the fastener; and generating an electrical potential in the erosion electrode sufficient to cause a breakdown in a gap between the erosion electrode and the fastener, to thereby cause a portion of the fastener to be eroded, the eroded portion being suspended in the dielectric fluid.

The EDM device of the disclosure can be used in a location in which the fastener to be eroded is not easily accessible by hand. Indeed, provided the housing of the EDM device can be positioned proximal to the fastener to be eroded then the EDM device can be operated to erode the fastener. This positioning operation may be carried out by a manipulator, whether robotic, autonomous or mechanically controlled by an operator.

In contrast, prior art portable EDM devices are restricted to use in regions in which an operator can both reach the fastener to be eroded and in which the operator has a direct line of sight to the fastener so that the EDM device can be correctly positioned. Incorrect positioning of such a portable EDM device can results in erosion of the incorrect part of the workpiece, which may result in the workpiece requiring costly and lengthy repair or even in the workpiece being scrapped.

Optionally, the erosion electrode is planar.

The use of a planar geometry for the erosion electrode enables the electrode portion to be easily and cheaply manufactured. A planar erosion electrode may more easily be moved in and out of the housing along the first axis because such movement may be linear.

Optionally, the step of positioning the housing on a surface of a workpiece and proximal to the fastener, comprises the steps of:
providing at least one alignment feature on the workpiece;
providing the housing with at least one alignment portion; and
positioning the housing on the surface of the workpiece and proximal to the fastener with the or each alignment portion being located against a corresponding one of the or each alignment features.

The interconnection between the one or more alignment portions and the corresponding alignment features means that the housing of the EDM device can be securely held against the surface of the workpiece without the need for an operator to hold the housing in place. This enables the EDM device to be operated in regions which are inaccessible to a human operator. This in turn makes the EDM device more useful and hence convenient for a user.

Optionally, the method comprises the additional step of:
evacuating the dielectric fluid from the EDM device.

The dielectric outlet provides a suction pressure to evacuate the dielectric fluid from the region between the erosion electrode and the fastener. This prevents the dielectric fluid from spilling over the workpiece and makes the EDM device more practical in the factory setting.

The dielectric outlet evacuates the dielectric fluid that has occupied the space between the erosion electrode and the fastener and has accumulated eroded particles from the fastener. This particle laden dielectric fluid can then be filtered to remove the debris particles and recycled back to the dielectric inlet.

Optionally, the step of positioning the housing on a surface of the workpiece and proximal to the fastener, comprises the step of:
positioning the housing on a surface of the workpiece and proximal to the fastener, to enclose a working volume, with the fastener extending into the working volume;
and the step of moving the erosion electrode in a first axis towards the fastener, the first axis being substantially normal to a longitudinal axis of the fastener, comprises the steps of:
positioning the erosion electrode within the working volume, and moving the erosion electrode in a first axis towards the fastener, the first axis being substantially normal to a longitudinal axis of the fastener.

By enclosing a working volume, the housing provides a space into which the dielectric fluid is delivered. This means that requiring the dielectric fluid to flood the region between the erosion electrode and the fastener improves the removal of debris particles and so improves the efficiency of the flushing process.

Optionally, the step of delivering a dielectric fluid to a region between the erosion electrode and the fastener, comprises the subsequent step of:
generating an outlet flow from the EDM device to produce a working pressure within the working volume, where the working pressure is less than an ambient pressure surrounding the housing.

The dielectric outlet provides a suction pressure to evacuate the dielectric fluid from the region between the erosion electrode and the fastener. This prevents the dielectric fluid from spilling over the workpiece and makes the EDM device more convenient for a user.

The dielectric outlet evacuates the dielectric fluid that has occupied the space between the erosion electrode and the fastener and has accumulated eroded particles from the fastener. This particle laden dielectric fluid can then be filtered to remove the debris particles and recycled back to the dielectric inlet.

Maintaining a working pressure within the working volume at a lower pressure than the ambient pressure surrounding the housing causes the housing to be pressed against the surface of the workpiece. This aids location of the housing against the workpiece and relative to the fastener. This also provides for a more complete seal between the housing and the surface of the workpiece so preventing leakage of the dielectric fluid from the working volume.

According to a third aspect of the present disclosure there is provided a computer program that, when read by a computer, causes performance of the method according to the second aspect.

The computer program may include details of the fastener to be eroded (material type, fastener size, time required for erosion process, etc.), together with a look-up routine to access the above-mentioned stored data from the computer readable storage medium.

According to a fourth aspect of the present disclosure there is provided a non-transitory computer readable storage medium comprising computer readable instructions that, when read by a computer, causes performance of the method according to the second aspect.

The computer readable storage medium may contain data about the material properties of the fastener together with associated pulsed voltage waveform data and dielectric fluid flow requirements.

According to a fifth aspect of the present disclosure there is provided a signal comprising computer readable instructions that, when read by a computer, causes performance of the method according to the second aspect.

The above-mentioned data stored in the computer readable storage medium may then be used to generate the required pulsed voltage waveform to the erosion electrode, to effect the appropriate drive signals to the electric motor to advance the erosion electrode, and also to provide the flow of dielectric fluid to the housing.

In an alternative arrangement, each of the housing 110 and cartridge portion 116 may comprise an RFID tag. This simplifies the configuration and selection of the EDM device by a user. The use of RID tags also facilitates the automation of the EDM process using the EDM device of the disclosure.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

There now follows a description of an embodiment of the disclosure, by way of non-limiting example, with reference being made to the accompanying drawings in which:

FIG. 4 shows a schematic arrangement of the EDM device of the present disclosure with an associated base station.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
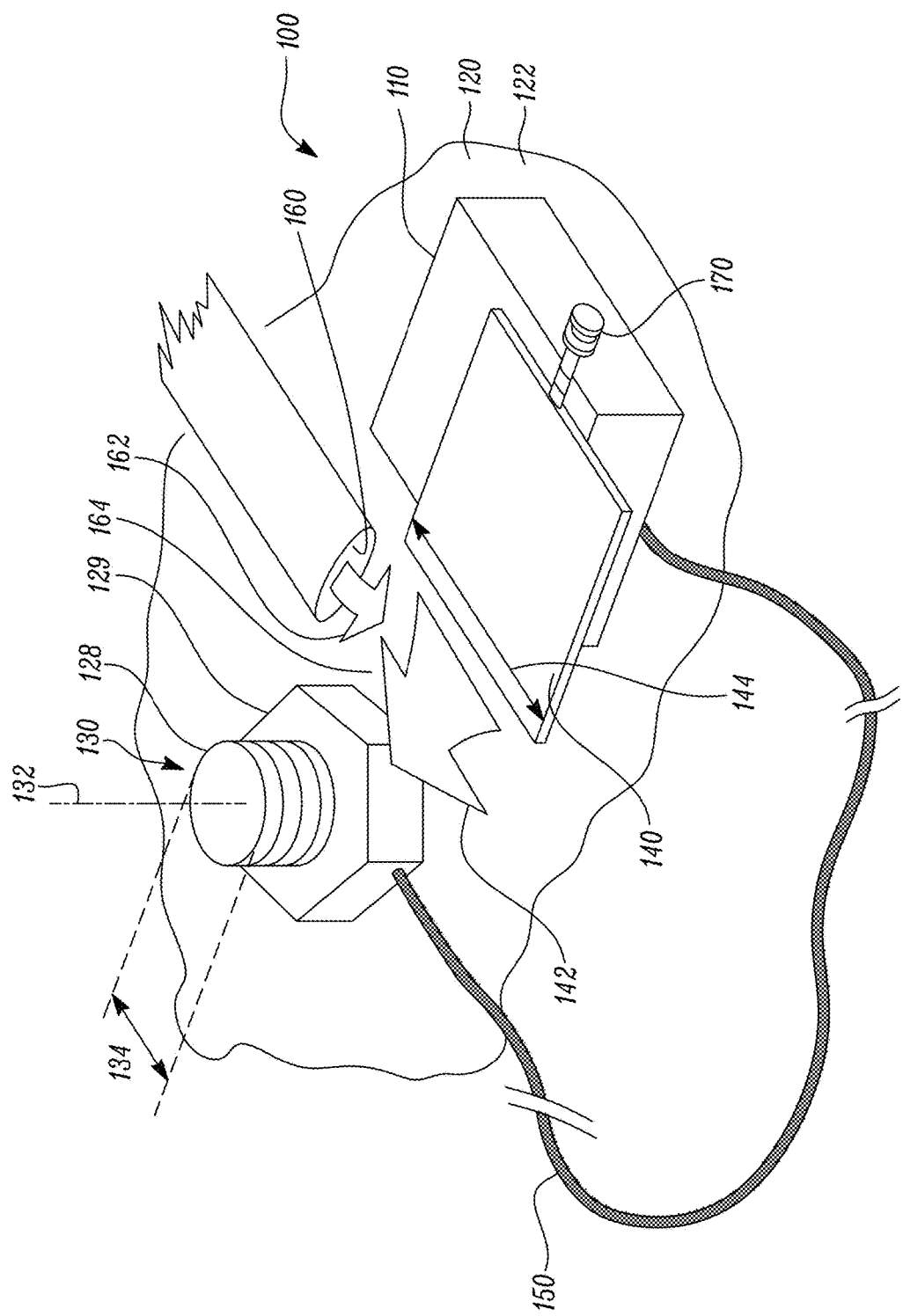
FIG. 1 shows a schematic perspective view of an EDM device according to a first embodiment of the disclosure.

Referring to FIG. 1, an electro-discharge machining device (EDM) according to a first embodiment of the disclosure is designated generally by the reference numeral 100.

The EDM device 100 comprises a housing 110, a planar erosion electrode 140, a ground electrode 150 and a dielectric inlet 160. The housing 110 can be positioned on a surface 122 of a workpiece 120, and proximal to a fastener 130 that is to be eroded. The fastener 130 comprises a bolt portion 128 and a nut portion 129. The bolt portion 128 is externally threaded and is threadingly received within the corresponding internally threaded portion of the nut portion 129. The bolt portion 128 has a lateral width 134.

The planar erosion electrode 140 is positioned at least partially within the housing 110. The erosion electrode 140 is movable relative to the housing 110 in a first axis 142. The first axis 142 is substantially normal to a longitudinal axis 132 of the fastener 130.

The ground electrode 150 is conductively connected to the fastener 140. The ground electrode 150 completes an electrical connection back to the erosion electrode 140.

The dielectric inlet 160 delivers a flow of a dielectric fluid 162 to a delivery region 164, which is the region between the erosion electrode 140 and the fastener 130.

In operation, the motion of the erosion electrode 140 relative to the fastener 130 is that of a conventional electro-discharge machining operation. An electric voltage in the form of a high frequency pulsed waveform is applied between the erosion electrode 140 and the fastener 130. The erosion electrode 140 is positioned against the fastener 130 with a small gap therebetween, which causes a spark to form in the gap. The details of this EDM operation are well known and will not be described further herein.

Figure 2:
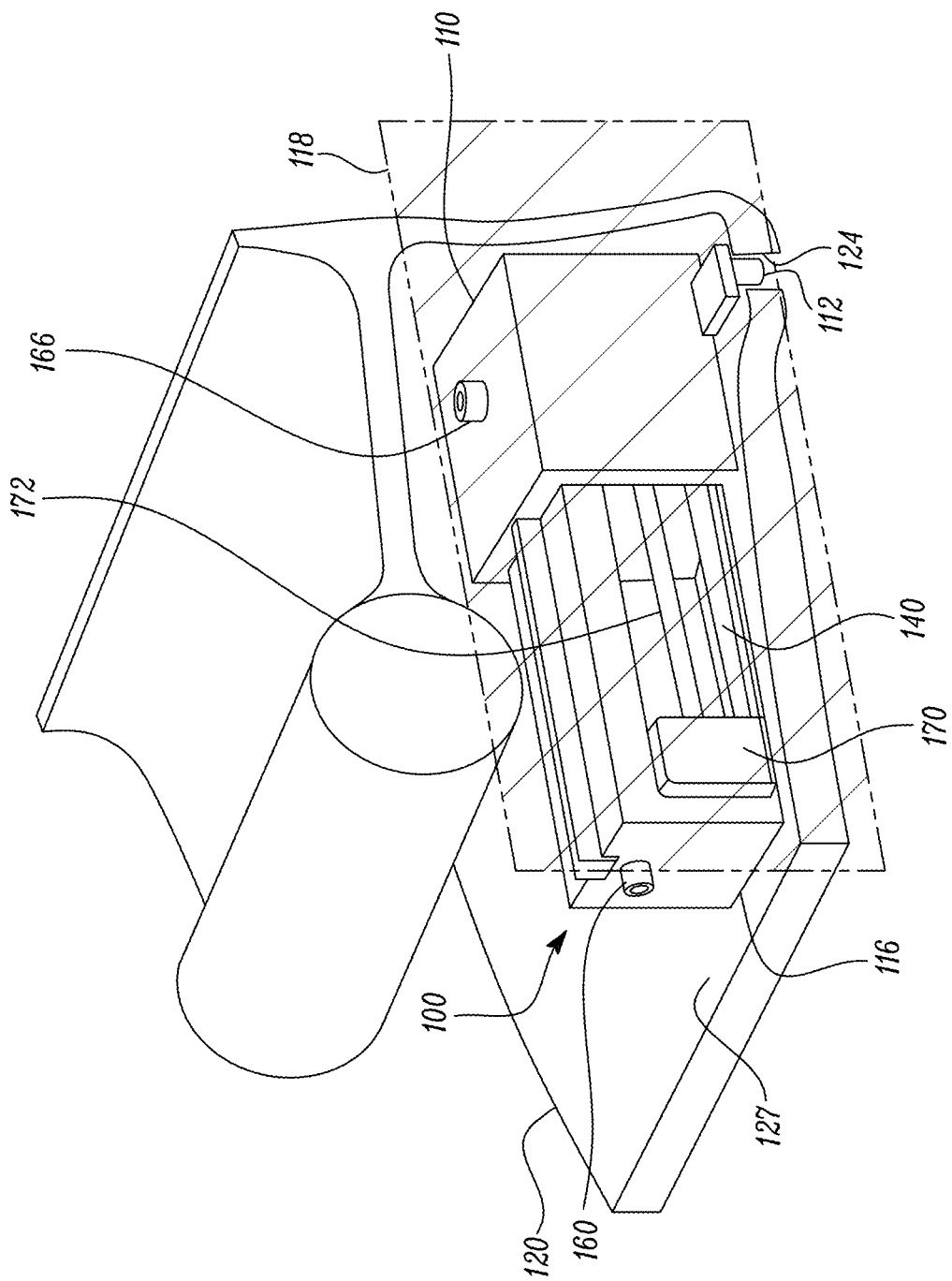
FIG. 2 shows a perspective view of an EDM device according to a second embodiment of the disclosure, positioned on a surface of a workpiece.
Figure 3:
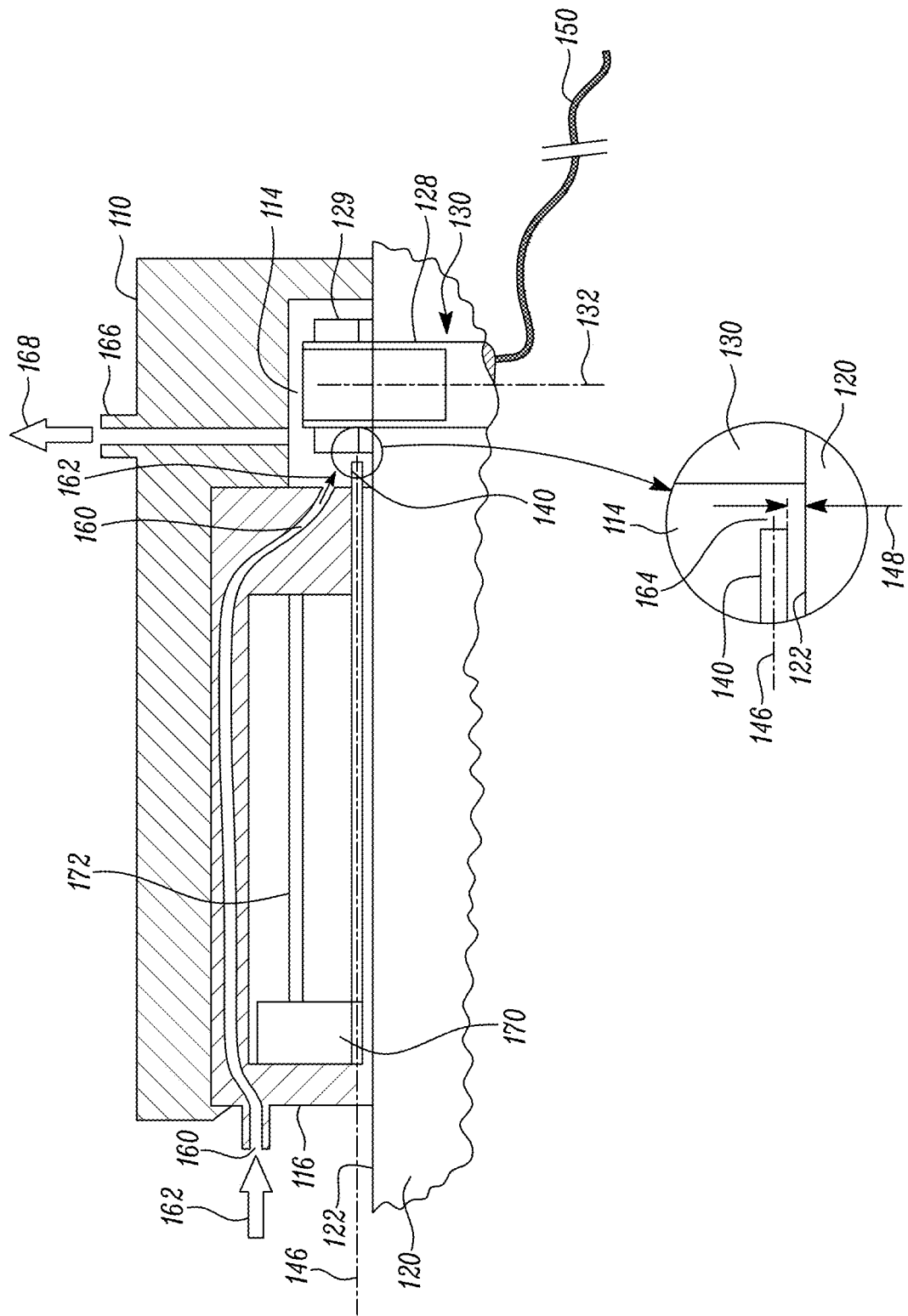
FIG. 3 shows a sectional view of the EDM device and workpiece of FIG. 2.

FIGS. 2 and 3, shows an EDM device 100 according to a second embodiment of the disclosure. As shown in FIGS. 2 and 3, the EDM device 100 is positioned over a fastener 130 to be eroded, and located against a surface 122 of a workpiece 120. FIG. 2 is a perspective view of the arrangement, while FIG. 3 is a sectional view through a mid-plane 118 of the housing 110. In the example of FIG. 2, the workpiece illustrates the inaccessible nature of the fastener 130.

In the arrangement shown in FIGS. 2 and 3, the housing 110 encloses the nut portion 129 of the fastener 130 as it protrudes from the surface 122 of the workpiece 120. The housing 110 defines a working volume 114 into which the fastener 130 protrudes, and into which the erosion electrode 140 moves as it approaches the nut portion 129 of the fastener 140.

The housing 110 includes two alignment portions 112, each positioned on opposite sides of one end of the housing 110. In the embodiment shown these alignment portions 112 take the form of protruding location pins 112. The surface 122 of the workpiece 120 has a number of alignment features 124, in this case in the form of recesses 124. Each of the alignment portions 112 fits closely into a corresponding one of the alignment features 124. This ensures that the housing 110 is precisely positioned on the surface 122 of the workpiece 120 relative to the fastener 130.

In other arrangements, the alignment features 124 may be protrusions with the alignment portions 112 being corresponding recesses. Alternatively, the alignment features 124 may be some other geometric shape of the surface 122 of the workpiece 120, with the alignment portions 112 being correspondingly shaped so as to locate against them.

The EDM device 100 has a dielectric outlet 166 that in this arrangement is positioned on an upper surface (relative to the surface 122 of the workpiece 120) of the housing 110. The dielectric outlet 166 evacuates the dielectric fluid 162 from the working volume 114.

In one arrangement, an outlet flow 168 of the dielectric fluid 162 is such as to generate a working pressure within the working volume 114. The working pressure is less than an ambient pressure surrounding the housing 110 by a working pressure drop of 35 kPa (approximately 5 psi). The working pressure drop urges the housing 110 against the surface 122 of the workpiece 120 and assists in the location of the housing 110 against the workpiece 120.

In the arrangement of FIGS. 2 and 3, the erosion electrode 130 together with the dielectric inlet 160, and an electric motor 170 are all located in a cartridge portion 116. The cartridge portion 116 is then removably located in the housing 110.

The dielectric inlet 116 comprises an internal channel within the cartridge portion 116 that directs the dielectric fluid 162 towards the delivery region 164. The delivery region 164 is that part of the working volume 114 between the erosion electrode 140 and the fastener 130.

The electric motor 170 advances and retracts the erosion electrode 140 along the first axis 142. An actuator guide rod 172 provides stability for the electric motor 170 and erosion electrode 140. The erosion electrode 140 passes through a slot at the end of the cartridge portion 116 closest to the fastener 130.

The movement of the erosion electrode 140 in the first axis 142 is in a plane 146 that is offset from the surface 122 of the workpiece 120 by a clearance 148. This clearance ensures that the erosion electrode 140 does not inadvertently damage the surface 122 of the workpiece 120.

In the arrangement shown in the figures, the erosion electrode 140 is flat. This geometry simplifies the movement of the erosion electrode 140 since this movement can be a straight forward linear motion. In other arrangements, the erosion electrode 140 may have other geometrical shapes. The erosion electrode 140 may have a curved cross-section, an elliptical cross-section or indeed a cross-sectional shape that is corresponds to a shape of a fastener that is to be eroded.

In this arrangement, a lateral width 144 of the erosion electrode 140 is greater than the lateral width 134 of the bolt portion 128 of the fastener 140. This means that the erosion electrode 140 can cut through the entire axial cross-section of the bolt portion 128 of the fastener 130 in a single pass.

In other arrangements, the lateral width 144 of the erosion electrode 140 may be less than a lateral width 134 of the bolt portion 128 of the fastener 140. This may be desirable of the fastener 130 is particularly close to other components of the workpiece 120, or attached to the workpiece 120, and which must not be disturbed or damaged in any way.

While the EDM device disclosed in FIGS. 2 and 3 comprises a single housing 110 with a single erosion electrode 140, in alternative arrangements of the disclosure the EDM device may comprise multiple housings 110 with multiple erosion electrodes 140. Such arrangements enable a user to electro-discharge machine multiple fasteners simultaneously. This makes the EDM device easier and more convenient for a user.

In use, as illustrated in FIG. 4, the EDM device 100 is connected to a base station 180 by an umbilical connection 182. The umbilical connection 182 provides electrical power to the electric motor 170, a pulsed electric supply to the erosion electrode 140, a feed flow of dielectric fluid 162 to the housing 110, and an exhaust flow 168 of dielectric fluid 162 from the housing 110.

The base station 180 comprises a dielectric delivery pump 188, a dielectric fluid filter 192 and a dielectric fluid reservoir 190. As mentioned previously, the dielectric fluid filter 192 removes the erosion debris from the dielectric fluid 162 before it is fed to the housing 110.

The base station also includes a dielectric evacuation pump 194 that provides the suction flow to create the working pressure within the working volume 114 of the housing 110.

As mentioned earlier, the electro-discharge machining process of the EDM device is conventional and so the base station also includes an electro-deposition pulse controller 184 that provides the pulsed voltage waveform to the erosion electrode 140. Control of the electro-deposition process and the EDM device 100 is effected by the system controller 195.

In this arrangement, the system controller 195 takes the form of a micro-computer having a computer readable storage medium 197. The storage medium 197 comprises in turn computer readable instructions 198 that, when read by the computer 195 cause operation of the EDM device 100. For example, the computer readable storage medium 197 may contain data about the material properties of the fastener 130 together with associated pulsed voltage waveform data and dielectric fluid flow requirements. Consequently, when a user inputs to the system controller 195 the details of the fastener 130 to be eroded (material type, fastener size, time required for erosion process, etc.), the system controller invokes a look-up routine to access the above-mentioned stored data from the computer readable storage medium 197. This is then used to generate the required pulsed voltage waveform to the erosion electrode 140, to effect the appropriate drive signals to the electric motor 170 to advance the erosion electrode 140, and also to provide the flow of dielectric fluid 162 to the housing 110.

In use, as illustrated in FIGS. 2 and 3, the cartridge portion 116 is located in the housing 110. The housing 110 is then attached to the surface 122 of the workpiece 120, by means of the alignment portions 112 being located against corresponding ones of the alignment features 142. This location ensures that the direction of motion of the erosion electrode 140, i.e. along the first axis 142, is normal to the longitudinal axis 132 of the fastener 130 and will erode through the desired portion of the fastener 130.

The housing 110 and cartridge portion 116 are connected to the umbilical connection 182. At this point the electro-discharge process can be implemented and the erosion electrode 130 will advance to erode through the fastener 130.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Moreover, in determining extent of protection, due account shall be taken of any element which is equivalent to an element specified in the claims. Various changes to the described embodiments may be made without departing from the scope of the invention.

What is claimed is:

1. An EDM device comprising:
   a housing configured to be positioned on a surface of a workpiece and proximal to a fastener to be eroded;
   a planar erosion electrode positioned at least partially within the housing, the erosion electrode being movable relative to the housing in a first axis;
   a ground electrode configured to be conductively connected to the fastener at an end portion of the ground electrode, the first axis being substantially normal to a longitudinal axis of the fastener; and
   a dielectric inlet being configured to deliver a dielectric fluid to a region between the erosion electrode and the fastener,
   wherein a plane of the erosion electrode is offset from the end portion by a gap formed in a direction of the first axis.

2. The EDM device as claimed in claim 1, wherein the housing comprises one or more alignment portions, and the or each alignment portion of the housing is configured to locate against the fastener, to secure the housing proximal to the fastener.

3. The EDM device as claimed in claim 1, wherein the fastener extends from the workpiece, the workpiece comprises one or more alignment features, the housing comprises one or more alignment portions, and the or each alignment portion of the housing is configured to locate against a corresponding alignment feature of the workpiece, to secure the housing proximal to the fastener.

4. The EDM device as claimed in claim 1, further comprising a dielectric outlet, wherein the dielectric outlet is configured to evacuate the dielectric fluid.

5. The EDM device as claimed in claim 1, wherein the housing is configured to enclose a working volume when positioned against the workpiece, the fastener extends from the workpiece into the working volume, the erosion electrode moves within the working volume, and the dielectric fluid is delivered into the working volume.

6. The EDM device as claimed in claim 5, wherein an outlet flow through the dielectric outlet produces a working pressure within the working volume, the working pressure being less than an ambient pressure surrounding the housing.

7. The EDM device as claimed in claim 6, wherein a difference between the ambient pressure and the working pressure is a working pressure drop, and the working pressure drop is greater than 14 kPa.

8. The EDM device as claimed in claim 1, further comprising an electric motor, wherein the electric motor is configured to bi-directionally move the erosion electrode relative to the end portion along the first axis.

9. The EDM device as claimed in claim 1, wherein the erosion electrode has a width in a direction of the first axis that is greater than a width of a bolt portion of the fastener in the direction of the first axis.

10. The EDM device as claimed in claim 1, wherein the erosion electrode is flat.

11. The EDM device as claimed in claim 1, further comprising a cartridge portion, wherein the erosion electrode is accommodated within the cartridge portion, and the cartridge portion is removably positioned within the housing.

12. The EDM device as claimed in claim 1, wherein the fastener extends above a surface of the workpiece.

13. A method of electro-discharge machining a fastener, the fastener being located in a workpiece, the method comprising the steps of:
   providing an EDM device comprising a housing, an erosion electrode, and a ground electrode;
   positioning the housing on a surface of the workpiece and proximal to the fastener;
   positioning the ground electrode in conductive connection with the fastener at an end portion of the ground electrode;
   delivering a dielectric fluid to a region between the erosion electrode and the fastener;
   moving the erosion electrode in a first axis towards the fastener, the first axis being substantially normal to a longitudinal axis of the fastener; and
   generating an electrical potential in the erosion electrode sufficient to cause a breakdown in a gap formed in a direction of the first axis between the erosion electrode and the end portion, to thereby cause a portion of the fastener to be eroded, the eroded portion being suspended in the dielectric fluid.

14. The method as claimed in claim 13, wherein the erosion electrode is planar.

15. The method as claimed in claim 13, wherein the step of positioning the housing on a surface of a workpiece and proximal to the fastener includes:
   providing at least one alignment feature on the workpiece,
   providing the housing with at least one alignment portion, and
   positioning the housing on the surface of the workpiece and proximal to the fastener with the or each alignment portion being located against a corresponding one of the or each alignment features.

16. The method as claimed in claim 13, wherein the method further comprises evacuating the dielectric fluid from the EDM device.

17. The method as claimed in claim 13, wherein the step of positioning the housing on a surface of the workpiece and proximal to the fastener includes positioning the housing on a surface of the workpiece and proximal to the fastener, to enclose a working volume, with the fastener extending into the working volume, and the step of moving the erosion electrode in the first axis towards the end portion includes positioning the erosion electrode within the working volume, and then moving the erosion electrode in the first axis towards the fastener.

18. The method as claimed in claim 17, wherein the step of delivering a dielectric fluid to a region between the erosion electrode and the fastener includes generating an outlet flow from the EDM device to produce a working pressure within the working volume, where the working pressure is less than an ambient pressure surrounding the housing.

19. A non-transitory computer readable storage medium storing a program that is executable by a computer provided with a processor that causes the computer to perform the method as claimed in claim 13.

20. A system comprising:
a workpiece having a fastener to be eroded; and
an EDM device comprising:
 a housing configured to be positioned on a surface of the workpiece and proximal to the fastener to be eroded;
 a planar erosion electrode positioned at least partially within the housing, the erosion electrode being movable relative to the housing in a first axis;
 a ground electrode configured to be conductively connected to the fastener, the first axis being substantially normal to a longitudinal axis of the fastener; and
 a dielectric inlet being configured to deliver a dielectric fluid to a region between the erosion electrode and the fastener,
 wherein a plane of the erosion electrode is offset from the fastener by a gap formed in a direction of the first axis.

* * * * *